United States Patent Office 2,835,658
Patented May 20, 1958

2,835,658

PROCESS FOR PREPARING POLYSTYRENE BLOCK POLYMERS

John L. Lang, Midland, Mich., assignor to The Dow Chemical Company, Midland, Mich., a corporation of Delaware No Drawing. Application March 1, 1957
Serial No. 643,214

7 Claims. (Cl. 260—93.5)

This invention relates to the preparation of polystyrene block polymers. More particularly it relates to the preparation of polystyrene blocks having specific end groups. For purposes of this application the term polystyrene blocks will be meant to include chains of polystyrene terminated at each end by functional groups, such as hydroxyl or carboxyl.

The exploitation of polyesters and polyamides has been seriously hampered by the unavailability and prohibitive cost of the appropriate alcohols, amines, and acids. The widespread acceptance of the existing polyesters and polyamides indicates an enormous potential for such polymers. It is apparent that if the inherent properties and other advantages of some of the known addition polymers could be built into the polyesters and polyamides, the scope of the utility of the latter polymers would be greatly extended. For example polystyrene is known to be hard, rigid, to have good solubility characteristics, and to be generally useful. If those characteristics of polystyrene could be incorporated into a polyester, the resulting polymer should be a most valuable material. To arrive at such a result it is necessary that polystyrene chains be terminated with an appropriate functional group, such as hydroxyl or carboxyl groups. Those polystyrene blocks could then be condensed with suitable reactive compounds to give the polyester, polyamide, or any other desired condensed material. Such blocks however have remained little more than laboratory curiosities because of the unavailability of the polystyrene blocks.

Accordingly it is the object of this invention to provide a process for preparing polystyrene blocks.

It is a further object to provide a process for preparing such blocks wherein the end groups are hydroxyl or carboxyl.

The above and related objects are achieved by means of a process whereby styrene and beta-propio-lactone are mixed and subjected to polymerization with a free-radical polymerization catalyst, after which the resulting polymer is solvolyzed.

Although the styrene and beta-propiolactone may be employed in almost any ratio, it should be apparent that there would be little use in employing a preponderant amount of the lactone. It has been found that the process results in valuable blocks when the styrene is present in an amount of from 50 to 95 percent by weight of the total monomer and the lactone in corresponding amount of from 50 to 5 percent by weight.

This process is a bulk polymerization and accordingly the catalysts to be used are the oil-soluble, free-radical catalysts. Typical of these catalysts are the peroxides, such as benzoyl and lauroyl peroxide, and azodiso-butyronitrile. The catalyst is employed in the usual concentration of from about 0.1 to 2.0 percent of the weight of the monomers.

The process is adaptable to either batchwise or continuous operation. When batchwise methods are used it is only necessary that the monomers and catalyst be intimately mixed and then caused to polymerize. The polymer containing the aforementioned blocks is ground, crushed, or broken up before the subsequent solvolysis step.

The process may also be used in conventional methods of continuous polymerization. It has been found that polystyrene blocks of uniform size may be made by means of a recirculating coil. In that method a homogeneous mixture of monomers and catalyst is prepared and introduced into a coil in continuous manner. The polymerization is allowed to arrive at an equilibrium at about 50 percent solids and monomerpolymer mixture withdrawn and fresh monomers introduced at rates such that the equilibrium and solids content are maintained.

The product resulting from the polymerization of styrene and the lactone consists of polyester chains having end groups dependent upon the catalyst employed. To arrive at the desired polystyrene blocks it is necessary to solvolyze and usually to hydrolyze the individual chains and end groups. The hydrolysis splits the chain at the ester linkages resulting in omega-hydroxy polyphenyl carboxylic acids. If hydroxyl groups are desired at both ends of the blocks, the acids may be reacted with glycols or other polyhydroxy compounds, which link two blocks together at the carboxylic ends leaving the omega-hydroxy ends free and the result is a polyester-poly-alcohol.

The blocks thus formed may be subjected to any of the common chemical reactions for such hydroxyl groups. For example when the blocks are treated with diisocyanates a polyurethane results. If the blocks are treated with dibasic acids the result is a polyester.

When it is desired to make the polystyrene blocks into a dibasic acid, the omega-hydroxy polyphenyl carboxylic acid should be treated with a dibasic acid to couple two of the polymeric acids at the omega-hydroxy groups to form a polyesterpolyacid. The resulting dibasic acid consists essentially of a polystyrene chain separating the carboxyl groups. When the blocks are treated with diamines the result is a polyamidepolyalcohol.

The dibasic acids thus formed may be subjected to the typical reactions of such groups. Thus, polyglycols, diamines, and the like may be mixed with the acids to form new polyesters and polyamides.

The operation and advantages of the process will be more apparent from the following illustrative example wherein all parts and percentages are by weight.

*Example*

A comonomer feed was prepared by thoroughly mixing 85 percent styrene and 15 percent beta propiolactone. This feed was introduced into a coil at a continuous rate and subjected to a temperature of 140° C. to cause polymerization. When the contents of the coil had reached about 50 percent solids the monomer-polymer mixture was removed continuously and a corresponding amount of monomer feed was introduced to maintain the solids content at about 50 percent. The withdrawn monomer-polymer mixture was devolatilized. The product upon infra-red analysis was found to contain 7 percent lactone. The product was hydrolyzed with water and ethylene glycol and heated to 200° C. at 5 mm. mercury until no more frothing or bubbling was noticed. The product was a hard solid and was then dissolved in toluene. Meta-toluene diisocyanate in stoichiometric amount was added to the toluene solution and heated to incipient boiling. After evaporation of the toluene the product was found to be an elastomeric solid.

The product after polymerization and devolatilization was found to have an intrinsic viscosity of 0.528. After hydrolysis and glycolysis the intrinsic viscosity was 0.885 and after coupling with diisocyanate the intrinsic viscosity was too high to be run with accuracy.

I claim:

1. A process for preparing polystyrene block polymers having specific end groups consisting of sequentially subjecting a mixture of styrene and beta-propiolactone to a free-radical bulk polymerization and hydrolyzing the so formed polymer with water.

2. The process claimed in claim 1 wherein said mixture is composed of from 50 to 95 percent by weight of styrene and correspondingly from 50 to 5 percent by weight of beta-propiolactone.

3. A process for preparing polystyrene block polymers having the same specific end groups consisting of sequentially subjecting a mixture of styrene and beta-propiolactone to a free radical polymerization, hydrolyzing the so-formed polymer with water and bringing the so-formed blocks into reactive contact with a polyfunctional compound capable of reacting with a group selected from hydroxyl and carboxyl with only one type of functional group present in the hydrolyzed product, to form a compound of the class consisting of polyesterpolyacids, polyesterpolyalcohols, and polyamidepolyalcohols.

4. The process claimed in claim 3 wherein said mixture of monomers is composed of from 50 to 95 percent by weight of styrene and correspondingly from 50 to 5 percent by weight of beta propiolactone.

5. The process claimed in claim 3 wherein said polyfunctional compound is a polyhydroxyalcohol and the product obtained is a polyesterpolyalcohol.

6. The process claimed in claim 5 wherein said polyhydroxy alcohol is a glycol and the product obtained is a polyesterpolyalcohol.

7. The process claimed in claim 3 wherein said polyfunctional compound is a dibasic acid and the product obtained is a polyesterpolyacid.

No references cited